United States Patent
Gemmill et al.

(10) Patent No.: US 12,254,045 B1
(45) Date of Patent: Mar. 18, 2025

(54) QUERYING A TELEMETRY DATASET

(71) Applicant: HONEYWELL INTERNATIONAL INC., Charlotte, NC (US)

(72) Inventors: Craig Gemmill, Montpelier, VA (US); Radu Siminiceanu, Glen Allen, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/368,018

(22) Filed: Sep. 14, 2023

(51) Int. Cl.
*G06F 16/00* (2019.01)
*G06F 16/901* (2019.01)
*G06F 16/903* (2019.01)

(52) U.S. Cl.
CPC .......... *G06F 16/902* (2019.01); *G06F 16/903* (2019.01)

(58) Field of Classification Search
CPC .................................................... G06F 16/902
USPC ........................................................ 707/693
See application file for complete search history.

*Primary Examiner* — Alexandria Y Bromell
(74) *Attorney, Agent, or Firm* — Alston & Bird LLP (57) ABSTRACT

Approaches for querying a telemetry dataset are described. The telemetry dataset may include telemetry data that may have been generated by a plurality of data endpoints of a physical asset within a facility. The querying of the telemetry dataset may be performed by initially using a semantic dataset. In an example, initially, the semantic dataset is queried by executing a first query comprising a query tag to identify a first data endpoint from amongst the plurality of data endpoints. Thereafter, a reference unique identifier which is linked with the first data endpoint is obtained to query the telemetry dataset by executing a subsequent query comprising the reference unique identifier. As a result of execution of the subsequent query, the telemetry data pertaining to the first data endpoint is retrieved.

20 Claims, 9 Drawing Sheets

QUERYING A TELEMETRY DATASET

BACKGROUND

Managing and operating a facility may involve analyzing the operation of its constituent systems or physical assets. A facility may include a variety of diverse physical assets that may be operating either in conjunction with each other, or independently. During the course of operation, data endpoints in the physical asset may generate telemetry data. An example of a data endpoint includes a sensor that may be present within the physical asset. The telemetry data obtained through the data endpoints may be collected for analysis. In the present context, a facility may refer to buildings, industrial sites, a manufacturing plant, or such. A facility may also include certain types of systems, such as an aircraft system.

BRIEF DESCRIPTION OF FIGURES

Systems and/or methods, in accordance with examples of the present subject matter are now described and with reference to the accompanying figures, in which.

DETAILED DESCRIPTION

As discussed previously, examples of a facility include, but are not limited to, buildings, industrial sites, a manufacturing plant, or such other examples. The term 'facility' may not only include the examples as mentioned above but may also refer to structures or systems which may be movable. For example, a facility may also refer to any system comprising various sub-systems, such as an aircraft system. An operational facility may include a variety of physical assets, and in some instances, it may include a large number of such physical assets. The type of such physical assets may vary depending on the nature of the facility.

The physical assets present in the facility may further include components or sub-systems depending on the type and nature of the facility. Examples of such physical assets include, but are not limited to, electronic components (such as circuit breakers), pressure valves, HVACs, alarm units, or building controllers, wherein the facility is a building. Another example of physical assets includes industrial sub-systems, industrial controllers, and such, wherein the facility may be a manufacturing facility. In the context of an aircraft, the physical assets may include avionic systems, flight management systems, etc. As would be understood, different sub-systems within a system may be considered as physical assets for that facility.

The physical assets may further include either a single data endpoint or may include multiple data endpoints, which may capture and generate telemetry data. The telemetry data may refer to and include data that is generated as a result of a physical or an operational state of the physical asset. An example of such a data endpoint is a sensor. A sensor may detect and capture values (i.e., telemetry data) which measure a parameter of a physical environment within which the sensor may be positioned. For example, the telemetry data captured by an environmental sensor may include readings pertaining to precipitation, pressure or temperature. In another example, the sensor, if deployed within machinery or other systems, may provide a measure of an operational parameter (e.g., current, voltage, and such). The telemetry data generated by the sensor may be associated with a timestamp representing a time instant at which such data is generated. The telemetry data once associated with the timestamp may be subsequently stored. The collected telemetry data may thus represent time-series data of a plurality of data values associated with the physical asset, with such values collected over a period of time. The telemetry data thus collected may be stored in a data repository, which may be locally accessible or may be stored in cloud-based storage.

In addition to the telemetry data, contextual information pertaining to the physical asset may also be maintained. Such contextual information may include various information, or metadata, about the physical assets. For example, the contextual information may represent geographical information or other positional information of the physical asset within the facility. The contextual information may indicate an operational setting for a sensor within the facility (say, the sensor is configured to sense or read data every 5 minutes). Thus, a wide variety of information pertaining to the physical asset and its functioning may form part of such contextual information. The contextual information, in turn, is maintained in a semantic dataset, which may collectively provide contextual information pertaining to different physical assets within either one facility or multiple facilities.

Although involving the same physical assets within the facility, the telemetry data and the semantic dataset pertaining to the physical assets are stored in different datasets. For example, telemetry data is maintained in a telemetry dataset as time-series data of a plurality of data values associated with a timestamp. The telemetry data in the telemetry dataset, however, bears no indication or identification to convey that the telemetry data that is being considered is from a particular data endpoint within the physical asset. On the other hand, the semantic dataset is structured differently, and in most instances, is stored in a relational database or in a structured dataset. The semantic datasets do not store any telemetry data. Thus, the semantic dataset may include the contextual information depicting various information or metadata linked to or describing functional, operational or other such related information of corresponding data endpoints and/or the physical assets.

Maintaining the telemetry data and the semantic data, as described above, poses numerous technical challenges. For example, it is not possible to identify the source or the data endpoint from which the telemetry data under consideration may have been obtained, particularly, in the context of a telemetry dataset comprising historical telemetry data. In such a case, it is also not possible to query the telemetry dataset and retrieve telemetry data for a reference data endpoint of the physical asset. Consequently, no analysis of the historically collected telemetry data may be possible. Alternative mechanisms for addressing such an issue may involve using a point naming convention for the telemetry data based on which the telemetry data may be retrieved. Such approaches, however, involve the user in defining identifiers that are to adhere to a strict naming convention. Such an approach may be prone to errors. Another mechanism may involve storing the telemetry data and the contextual information in one database. Such mechanisms may also be computationally expensive and may have an adverse impact on storage and access performances.

Approaches for querying a telemetry dataset are described herein. The telemetry dataset may include telemetry data that may have been generated by a plurality of data endpoints of a physical asset within a facility. The querying of the telemetry dataset may be performed by initially using a semantic dataset. In an example, the semantic dataset may provide a variety of contextual information, such as metadata, pertaining to the plurality of data endpoints within a facility.

In an example, a first query comprising a query tag as an argument may be executed on the semantic dataset. The semantic dataset may include contextual information (such as metadata) of the data endpoints of the physical asset. In addition, the semantic dataset may further include a plurality of unique identifiers. The unique identifiers may correspond to the respective data endpoints of the physical asset. In an example, the data endpoints may also be associated with prespecified tags, which may also be linked to or associated with the contextual information of the data endpoints of the corresponding physical assets.

In response to the execution of the first query, a first data endpoint from amongst the plurality of data endpoints may be identified. In an example, identification of the first data endpoint may involve comparing the query tag provided in the first query with each of the prespecified tags of the data endpoints, as specified in the semantic dataset. The data endpoint with the matching prespecified tag is identified as the first data endpoint. Once the first data endpoint is identified, the corresponding unique identifier, referred to as the reference unique identifier, may be obtained.

The telemetry dataset comprises current or historical telemetry data that may have been generated by the data endpoints. In an example, the telemetry data of different data endpoints is mapped to the unique identifiers of the data endpoints. Since the telemetry data within the telemetry dataset is mapped with the unique identifiers of the different data endpoints, the unique identifiers may be used for identifying and retrieving the telemetry data corresponding to selected data endpoints, using the unique identifiers.

To this end, the reference unique identifier of the first data endpoint is thereafter used for querying the telemetry dataset. In an example, a subsequent query with the reference unique identifier as an argument may be executed on the telemetry dataset. In response to the execution of the query, the reference unique identifier is compared with the unique identifiers that are mapped to the telemetry data of the different data endpoints. Depending on the comparison, the appropriate telemetry data of the data endpoint may be identified and retrieved from the telemetry dataset.

In this manner, appropriate telemetry data for corresponding data endpoints may be retrieved. Furthermore, since the semantic dataset also comprises predefined tags, the semantic dataset may be queried using one or more tags. Such approaches thus allow the retrieval of telemetry data in an extensible manner. Once the telemetry data is obtained, any user, such as a facility manager, may further analyze the telemetry data to gain meaningful insights into the operation of the physical asset, and accordingly manage the operation of the facility. Such insights may be utilized for implementing decisional controls to further the efficient operation of the physical asset, and in turn, the entire facility. The approaches described above provide an efficient mechanism for identifying and retrieving telemetry data that may have been generated from selected data endpoints. These and other aspects are further explained in conjunction with the accompanying figures.

Figure 1:
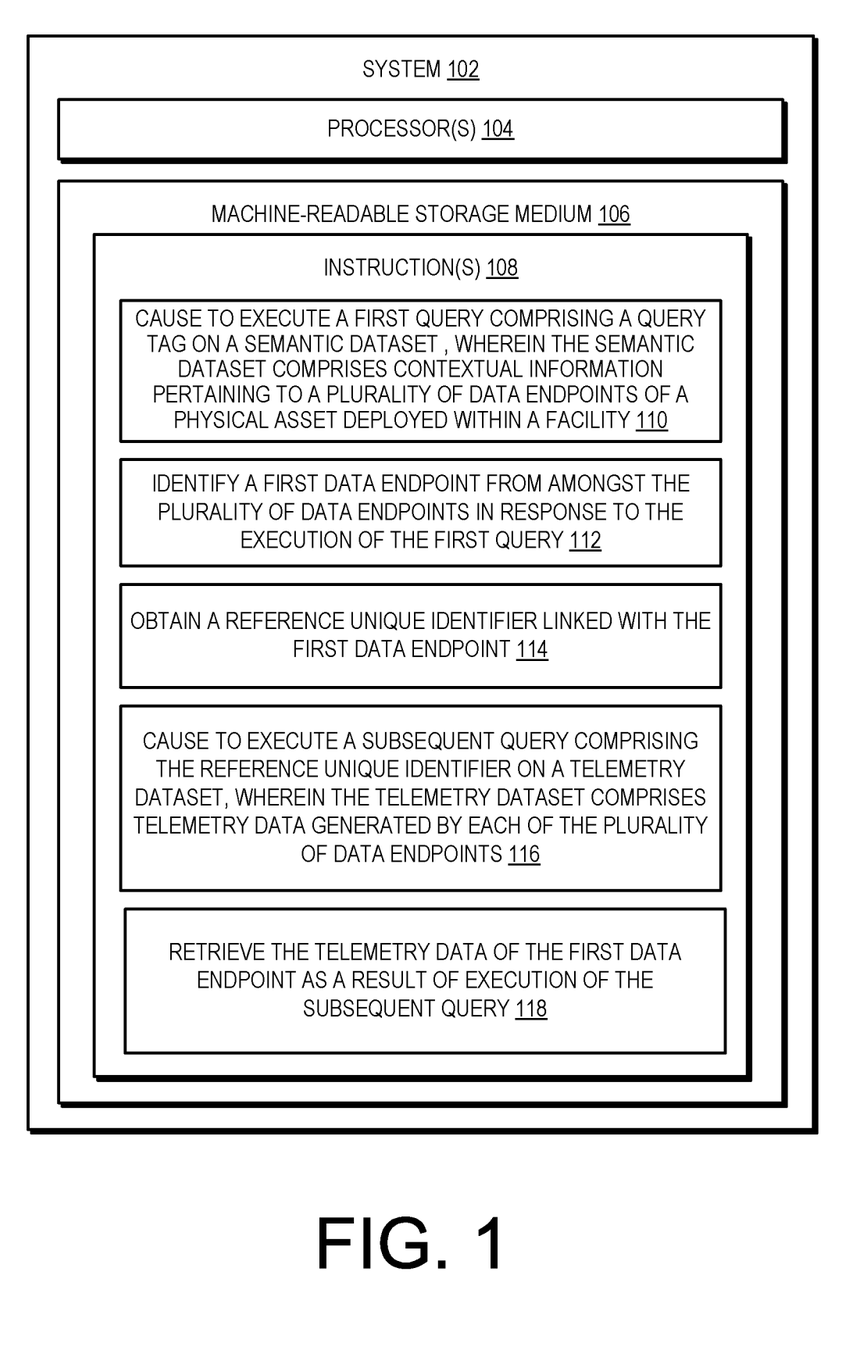
FIG. 1 illustrates a system for querying a telemetry dataset, as per an example.

FIG. 1 illustrates system 102 which is to query a telemetry dataset, as per one example. As explained previously, the telemetry dataset may include telemetry data generated by data endpoints of physical assets. The querying of the telemetry dataset is performed by initially querying a semantic dataset, which stores and maintains contextual information of the different data endpoints. The telemetry data may be obtained from a facility, such as industrial sites, a manufacturing plant, or an aircraft. The system 102 may be communicatively coupled with the telemetry dataset and the semantic dataset (not depicted in FIG. 1).

The system 102 includes a processor 104 and a machine-readable storage medium 106 which is coupled to, and accessible by, the processor 104. The system 102 may be implemented in any computing system, such as a storage array, server, desktop or a laptop computing device, a distributed computing system, or the like. Although not depicted, the system 102 may include other components, such as interfaces to communicate over the network with the telemetry dataset and the semantic dataset, communicate with external storage or computing devices, display, input/output interfaces, operating systems, applications, data, and other software or hardware components (all of which have not been depicted for sake of conciseness). In an example, machine-readable storage medium 106 may further include instruction(s) 108.

The processor 104 may be implemented as a dedicated processor, a shared processor, or a plurality of individual processors, some of which may be shared. The machine-readable storage medium 106 may be communicatively connected to the processor 104. Among other capabilities, the processor 104 may fetch and execute computer-readable instructions, including instruction(s) 108, stored in the machine-readable storage medium 106. The machine-readable storage medium 106 may include non-transitory computer-readable medium including, for example, volatile memory such as RAM (Random Access Memory), or non-volatile memory such as EPROM (Erasable Programmable Read Only Memory), flash memory, and the like. The instruction(s) 108 may be executed to query for the telemetry data stored in the telemetry dataset.

In operation, the processor 104 may fetch and execute instruction(s) 108 for performing one or more actions, as discussed further. In an example, the execution of instructions 110 may cause to execute a first query comprising a query tag. The first query is executed on a semantic dataset. The semantic dataset includes contextual information pertaining to a plurality of data endpoints of a physical asset deployed within the facility. In addition to the contextual information, the semantic dataset also includes a plurality of unique identifiers, which in turn, are linked to the different data endpoints.

Upon execution of the first query, the instructions 112 may be executed to identify a first data endpoint from the different data endpoints. Thereafter, execution of the instructions 114 may obtain a reference unique identifier linked with the first data endpoint. Once the first unique identifier is determined, the execution of the instructions 116 may cause to execute a subsequent query. In an example, the subsequent query may utilize the reference unique identifier as an argument. The subsequent query is executed on the telemetry dataset. The instructions 118 may thereafter cause the retrieved telemetry data of the first data endpoint to be obtained. In an example, the retrieved telemetry data may be subjected to further assessments for obtaining insights into the working of the facility.

Figure 2:
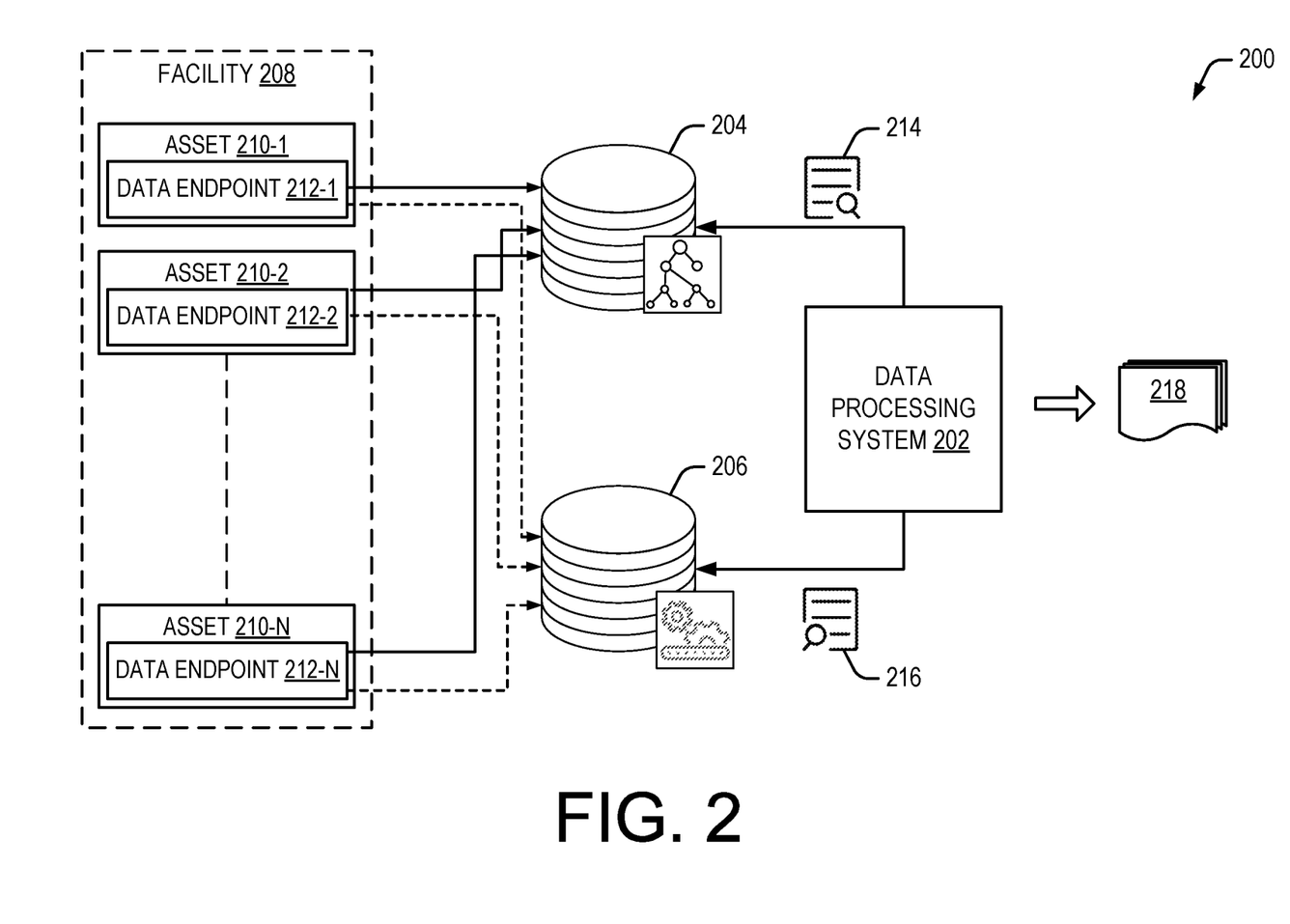
FIG. 2 illustrates an environment comprising a system for querying a telemetry dataset, as per an example.

FIG. 2 depicts an environment 200 comprising a data processing system 202 (also referred as system 202) which is to query a telemetry dataset. In an example, the system 202 may be communicatively coupled with a semantic dataset 204 and a telemetry dataset 206. The system 202 may be coupled with the semantic dataset 204 and the telemetry dataset 206 through a network. In an example, the network may be a private network or a public network and may be implemented as a wired network, a wireless network, or a combination of a wired and wireless network. The network may also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

The semantic dataset 204 and the telemetry dataset 206 store and maintain contextual information and telemetry data, respectively. In an example, both the semantic dataset 204 and the telemetry dataset 206 may be in communication with a facility 208. The facility 208 may refer to different types of systems. Examples of such systems include buildings, industrial sites, a manufacturing plant, or complex systems such as aircraft systems. It may be noted that the above examples and only indicative—other types of such complex systems may also be considered as a facility 208. Although not depicted, the semantic dataset 204 and the telemetry dataset 206 may include one or more executable instructions which may cause execution of one or more queries on the respective datasets.

The facility 208 may further include a plurality of physical assets 210-1, 2, 3, . . . N. Examples of such physical assets 210-1, 2, 3, . . . N (collectively referred to as physical assets 210) may refer to a variety of different electronic components (such as circuit breakers), pressure valves, HVACs, alarm units, or building controllers, wherein the facility is a building. Another example of physical assets include industrial subsystems, industrial controllers, and such, wherein the facility may be a manufacturing facility. In the context of the facility 208 being an aircraft, the physical assets 210 may include avionic systems, flight management systems, etc. As would be understood, different sub-systems within a system may be considered as physical assets for that facility. It may be noted that type of physical assets 210 may depend on the function and the type of the facility 208.

The physical assets 210 may further include either a single data endpoint or may include multiple data endpoints, which may capture and generate telemetry data corresponding to the respective physical assets 210. For example, the physical asset 210-1 includes the data endpoint 212-1, the physical asset 210-2 includes the data endpoint 212-2, and so on till the physical asset 210-N which includes the data endpoint 212-N (the data endpoints being collectively referred to as the data endpoints 212). It may be noted that although the present example as depicted in FIG. 2 illustrates the different physical assets 210 as having only a single data endpoint. For example, the physical asset 210-1 is shown to include only a single data endpoint 212-1. The physical asset 210-1 (or any of the other physical assets 210) may include multiple other data endpoints without deviating from the scope of the present subject matter.

Contextual information pertaining to the data endpoints 212 within the respective physical assets 210 may be stored in the semantic dataset 204. In an example, the contextual information may include various information, or metadata, about the respective physical assets 210. For example, the contextual information may represent geographical information or other positional information of the physical assets 210 within the facility 208. The contextual information may indicate an operational setting for one of the data endpoints 212, say data endpoint 212-1, within the facility 208. An operational setting may refer to and include information pertaining to whether the data endpoints 212 under consideration are operating or not. It may also specify the duration for which the said data endpoints 212 are to be operating. The contextual information may also include identifying information of the data endpoints 212. For example, it may specify a name, make or such other information pertaining to the data endpoints 212. It may be noted that the above examples of the contextual information stored in the semantic dataset 204 is only one of the possible other examples. Such other examples too would be falling within the scope of the present subject matter.

The various data endpoints 212 respectively generate telemetry data. The telemetry data may refer to and include data that is generated as a result of a physical or an operational state of the physical asset, such as any one or more of the physical assets 210. An example of such a data endpoint is a sensor, which is capable of sensing or measuring values of different parameters, such as environmental parameters wherein the data endpoints 212 may measure precipitation, pressure or temperature. Or the data endpoints 212 may also measure and depict a measure of the operational parameter (e.g., current, or voltage) which is being measured by the data endpoints 212. In an example, the telemetry data generated by the data endpoints 212 may be associated with a timestamp representing a time instant at which such data was captured by the data endpoints 212. The telemetry data once associated the timestamp may be subsequently stored in the telemetry dataset 206.

The facility 208 and the physical assets 210 may also be communicatively coupled with the semantic dataset 204 and the telemetry dataset 206 through a communication network. Although not described, the collection of the telemetry data and the contextual information may be implemented through one or more functional elements, or engines, which may be operating within the facility 208. For instance, an example telemetry engine may be implemented within the facility 208. The example telemetry engine may, over a period of time, monitor and collect the telemetry data provided by the different data endpoints 212. In an example, the telemetry data thus collected by the example telemetry engine may be time-stamped and stored in the telemetry dataset 206.

In a similar manner, an example contextual information engine may determine the relevant contextual information pertaining to the different data endpoints 212 and store the same in the semantic dataset 204. In an example, the relevant contextual information may be obtained by the example contextual information engine directly by examining the metadata that may be available within the different data endpoints 212 and the physical assets 210. In another example, the contextual information may be specified by a user, such as a facility manager. The facility manager may provide and configure the example contextual information engine to store the same in the semantic dataset 204. The contextual information thus provided by the facility manager may be prescribed in an ad-hoc manner or may be specified as part of predefined schema. In an example, the telemetry engine and the composer information engine may be implemented as a controller system which is capable of detecting the physical assets 210 and then retrieving the telemetry data and the semantic data pertaining to such physical assets 210. The controller system may in turn be a single standalone system or may be implemented as a combination of disparate controller systems, functioning collectively for collecting the telemetry data and the contextual information and storing the same in the semantic dataset 204 and the telemetry dataset 206.

In operation, the system 202 may initially query the semantic dataset 204 based on a query tag. The querying may be performed by a first query which utilizes a query tag as an argument. The first query, depicted as first query 214, may be executed on the semantic dataset 204. Thereafter, based on the execution of the first query 214, the system 202 may accordingly execute a subsequent query 216 on the telemetry dataset 206. In response to the subsequent query 216 being executed on the telemetry dataset 206, the system 202 may retrieve the appropriate telemetry data, as data 218, corresponding to the data endpoints 212 for which the first query 214 was executed.

Figure 3:
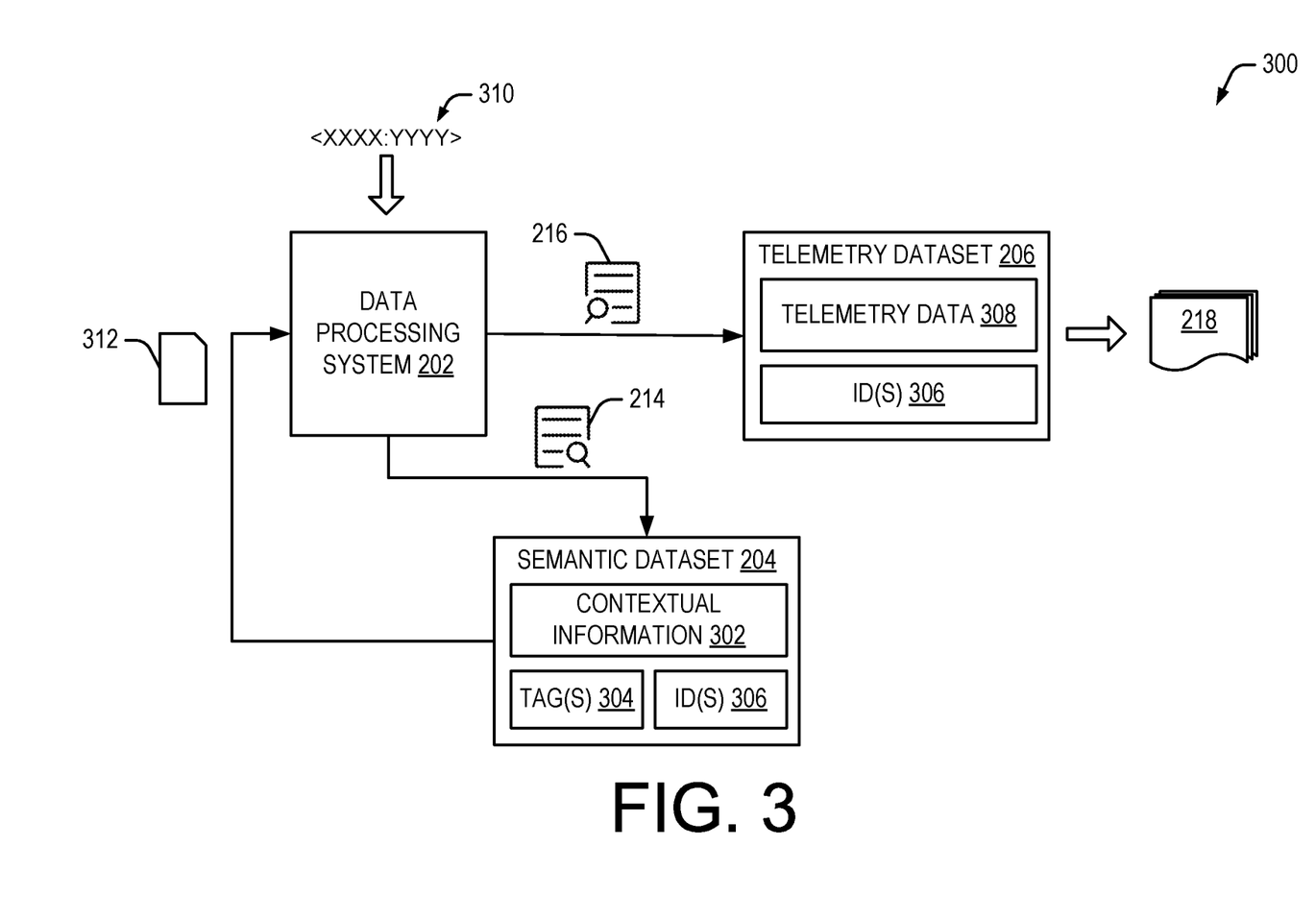
FIG. 3 illustrates a data processing system for querying a telemetry dataset, as per another example.
Figure 4:
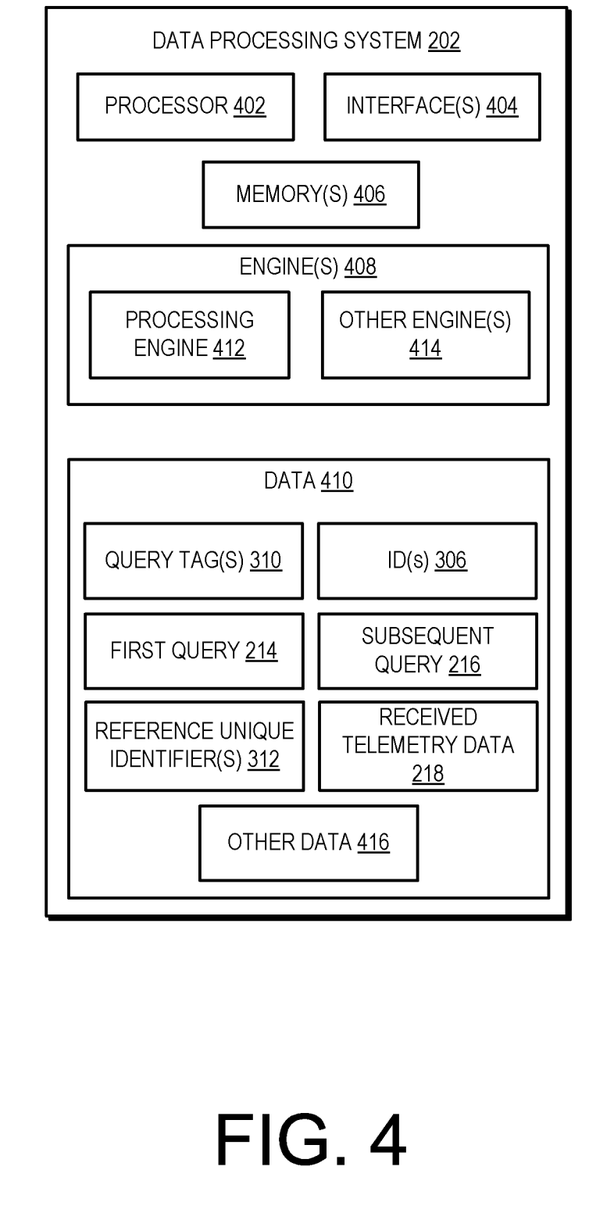
FIG. 4 illustrates a block diagram of a data processing system, as per an example.

Further details pertaining to the operation of the system 202 is described in conjunction with FIGS. 3-4. FIG. 3 provides an example network 300, in which the system 202 is to query the telemetry data, while FIG. 4 depicts various functional blocks of the system 202, as per an example. Similar to what has been explained in conjunction with FIG. 2, the system 202 is communicatively coupled with the semantic dataset 204 and the telemetry dataset 206. The semantic dataset 204 may further include contextual information 302. As discussed above the contextual information 302 may include various information, or metadata, about the respective physical assets 210, such as positional information of the physical assets 210 within the facility 208, duration for which the said data endpoints 212 are to be operating. The contextual information 302 may also include identifying information of the data endpoints 212. For example, it may specify a name, type, make or such other information pertaining to the data endpoints 212.

The semantic dataset 204 may further include one or more tag(s) 304. In an example, the tag(s) 304 may be associated with the contextual information 302. The tag(s) 304 may be used to indicate through one or more words or recognizable characters, certain attributes of the corresponding data endpoints 212. The tag(s) 304 may be assigned to the respective data endpoints 212 by the controller system at the time of obtaining the contextual information 302 from the data endpoints 212. With the tag(s) 304 assigned, the controller system may also determine the corresponding tag(s) 304 which in turn, may be stored in the semantic dataset 204. In an example, the tag(s) 304 may specify a name of the data endpoints 212, a value for the data endpoints 212 and a tag name. In another example, the tag(s) 304 may further specify any further information parameters which may classify or characterize the data endpoints 212.

As an example, hvac:temp is one such tag that may be associated with a temperature sensor of Heating, Ventilation, and Air Conditioning (HVAC) System. As may be noted, the portion of the tag 'hvac' denotes that the temperature sensor (denoted by 'temp') is associated with the HVAC system. In a similar manner, various other tag(s) 304 may be provided for the multiple data endpoints 212. In the present example, the example tag also indicates relation of the data endpoints 212 with the corresponding physical assets 210. This and other information may be depicted in a variety of different ways through the tag(s) 304.

It may be noted that the tag(s) 304 may be user defined or may be system generated, without deviating from the scope of the present subject matter. In case of the latter, the tag(s) 304 may be determined and allocated to the data endpoints 212 based on predefined tag dictionaries. The tag dictionaries may define tag-related nomenclature that is to be adopted for tagging the data endpoints 212. In an example, process of determining tags may be automated by way of executable instructions. Any one of such approaches may be adopted without limiting the scope of the present subject matter.

The semantic dataset 204 may further include unique identifiers for the data endpoints 212 in the facility 208. In an example, the unique identifiers (referred to as ID(s) 306) may be assigned by the controller system. The ID(s) 306 may be a globally unique identifier or a universally unique identifier. The ID(s) 306, similar to the contextual information 302, may be obtained by the controller system and stored in the semantic dataset 204.

With respect to the telemetry dataset 206, the telemetry dataset 206 includes the telemetry data 308. The telemetry data 308 may refer to data that is generated by the data endpoints 212 within the facility 208. As described earlier, the controller system may collect the telemetry data, and store the same in the telemetry dataset 206 as telemetry data 308. In an example, the controller system may timestamp the telemetry data thus collected and store the time-stamped telemetry data within the telemetry data 308. In another example, the controller system may also determine the ID(s) 306 of the data endpoints 212 from which the telemetry data was generated and store the same in the telemetry dataset 206.

FIG. 4 illustrates one or more functional blocks of the data processing system 202, as per an example. The system 202 includes a processor 402, interface(s) 404, and memory(s) 406. The processor 402 may be implemented as microprocessors, microcomputers, microcontrollers, digital signal processors, central processing units, state machines, logic circuitries, and/or other devices that manipulate signals based on operational instructions. The interface(s) 404 may allow the connection or coupling of the data processing system 202 (system 202) with one or more other devices, through a wired (e.g., Local Area Network, i.e., LAN) connection or through a wireless connection (e.g., Bluetooth®, Wi-Fi). The interface(s) 404 may also enable intercommunication between different logical as well as hardware components of the data processing system 202. The interface(s) 404 may also enable the system 202 to communicate with other entities, such as the semantic dataset 204 and the telemetry dataset 206.

The memory(s) 406 may be a computer-readable medium, examples of which include volatile memory (e.g., RAM), and/or non-volatile memory (e.g., Erasable Programmable read-only memory, i.e., EPROM, flash memory, etc.). The memory(s) 406 may be an external memory, or internal memory, such as a flash drive, a compact disk drive, an external hard disk drive, or the like. The memory(s) 406 may further include data which either may be utilized or generated during the operation of the system 202.

The memory(s) 406 may be a computer-readable medium, examples of which include volatile memory (e.g., RAM), and/or non-volatile memory (e.g., Erasable Programmable read-only memory, i.e., EPROM, flash memory, etc.). The memory(s) 406 may be an external memory, or internal memory, such as a flash drive, a compact disk drive, an external hard disk drive, or the like. The memory(s) 406 may further include data which either may be utilized or generated during the operation of the system 202.

The system 202 may further include engine(s) 408 and data 410. The engine(s) 408 may be implemented as a combination of hardware and programming, for example, programmable instructions to implement a variety of functionalities of the engine(s) 408. In examples described herein, such combinations of hardware and programming may be implemented in several different ways. For example, the programming for the engine(s) 408 may be executable instructions. Such instructions may be stored on a non-transitory machine-readable storage medium which may be coupled either directly with the system 202 or indirectly (for example, through networked means). In an example, the engine(s) 408 may include a processing resource, for example, either a single processor or a combination of multiple processors, to execute such instructions. In the present examples, the non-transitory machine-readable storage medium may store instructions that, when executed by the processing resource, implement engine(s) 408. In other examples, the engine(s) 408 may be implemented as electronic circuitry.

The engine(s) 408 includes a processing engine 412 and other engine(s) 414. The other engine(s) 412 may further implement functionalities that supplement functions performed by the system 202 or any of the engine(s) 408. The data 410, on the other hand, includes data that is either stored or generated as a result of functions implemented by any of the engine(s) 408 or the system 202. It may be further noted that information stored and available in data 410 may be utilized by the engine(s) 408 for performing various functions by the system 202. In an example, data 410 may include query tag(s) 310, the ID(s) 306, first query 214, the subsequent query 216, the reference unique identifier(s) 312, the received telemetry data 218 and other data 416. It may be noted that such examples of the various functional are only indicative. The present approaches may be applicable to other examples without deviating from the scope of the present subject matter.

In operation, one or more query tag(s) 310 may be received by the system 202. The query tag(s) 310 may be received from an individual user, such as a facility manager associated with the facility 208 and may be stored in the system 202. The query tag(s) 310 may specify one or more values based on which the corresponding tag(s) 304 may be searched. In an example, the query tag(s) 310 may specify a query-name, or a query-value as argument types. In the present example, the query-name may include a name of any one of the data endpoints 212 (which may have been specified as a tag for such data endpoints 212). The query-value argument may refer to a value based on which one or more data endpoints 212 may have to be determined. An example of query-value as an argument may include the terms 'ON' or 'OFF' or may include binary digits '1' or '0', to ascertain data endpoints 212 which are either functional or non-functional. In a similar manner other argument types may be used.

Once received, the processing engine 412 may generate a first query 214 based on the query tag(s) 310 as arguments. In an example, the processing engine 412 to generate the first query 214 may initially parse the query tag(s) 310 to identify the parameters that may have been provided. Once parsed, the relevant parameters may be obtained. Thereafter, the processing engine 412 may generate the first query 214 using such parameters obtained by parsing the query tag(s) 310.

The first query 214 may then be executed by the processing engine 412 on the semantic dataset 204. In an example, the execution of the first query 214 may be implemented through one or more executable instructions which when executed, may result in the execution of the first query 214. As explained previously, the semantic dataset 204 may include contextual information 302, the tag(s) 304 and the ID(s) 306 corresponding to the data endpoints 212. Since the first query 214 include arguments provided in the query tag(s) 310, the execution of the first query 214 results in determining the unique identifiers of certain data endpoints 212 for which the tag(s) 304 correspond to the arguments of the query tag(s) 310. For example, the query tag(s) 310 may specify 'hvac' as one of the arguments in the first query 214. Although the query tag(s) 310 has been described using examples pertaining to a single argument, the query tag(s) 310 may be such that they pertain to or include multiple tags. In such cases, the first query 214 may be generated using such multiple tags as arguments within the first query 214, without deviating from the scope of the present subject matter.

Upon execution, the processing engine 412 may cause comparison of the argument provided in the first query 214 with the tag(s) 304 provided in the semantic dataset 204. Based on the comparison, the processing engine 412 may determine a first data endpoint for which the tag(s) 304 correspond to the arguments provided in the first query 214. For the current example, it may be assumed that the processing engine 412 identified the data endpoint 212-1 as the first data endpoint.

Once the first data endpoint (i.e., the data endpoint 212-1) is determined, the processing engine 412 may determine its corresponding unique identifier, referred to as reference unique identifier(s) 312. It may be noted that in addition to the data endpoint 212-1, other data endpoints 212 may also be identified based on the reference unique identifier(s) 312. Such examples would be within the purview of the present subject matter.

The reference unique identifier(s) 312 once determined, is used by the processing engine 412 to generate a subsequent query 216 based on the reference unique identifier(s) 312, as the argument. Thereafter, the processing engine 412 may execute the subsequent query 216 on the telemetry dataset 206. It may be noted that the subsequent query 216 includes the reference unique identifier(s) 312 as the argument. When executing, the reference unique identifier(s) 312 as the argument is compared with the ID(s) 306 provided in the telemetry dataset 206. The ID(s) 306 identify the data endpoints 212 and the corresponding telemetry data 308. The execution of the subsequent query 216 thus identifies the corresponding ID(s) 306 which match or conform with the reference unique identifier(s) 312 as specified in the subsequent query 216.

The processing engine 412, on determining ID(s) 306 which match the reference unique identifier(s) 312, may accordingly identify the telemetry data 308 corresponding to the identified ID(s) 306. The corresponding telemetry data is stored in the system 202 as the received telemetry data 218.

The received telemetry data 218 may thereafter be gathered for subsequent analysis to gain insights into the working and operation of the physical assets 210 within the facility 208. As may be noted, the received telemetry data 218 is identified based on the reference unique identifier(s) 312, which in turn may be determined based on different query tag(s) 310. In this manner, the appropriate telemetry data 308 for certain data endpoints 212 of the physical assets 210 may be obtained. Since the query tag(s) 310 themselves may be extensible, the retrieval of the telemetry data 308 (as the received telemetry data 218) is also performed in an extensible and efficient manner.

Figure 5:
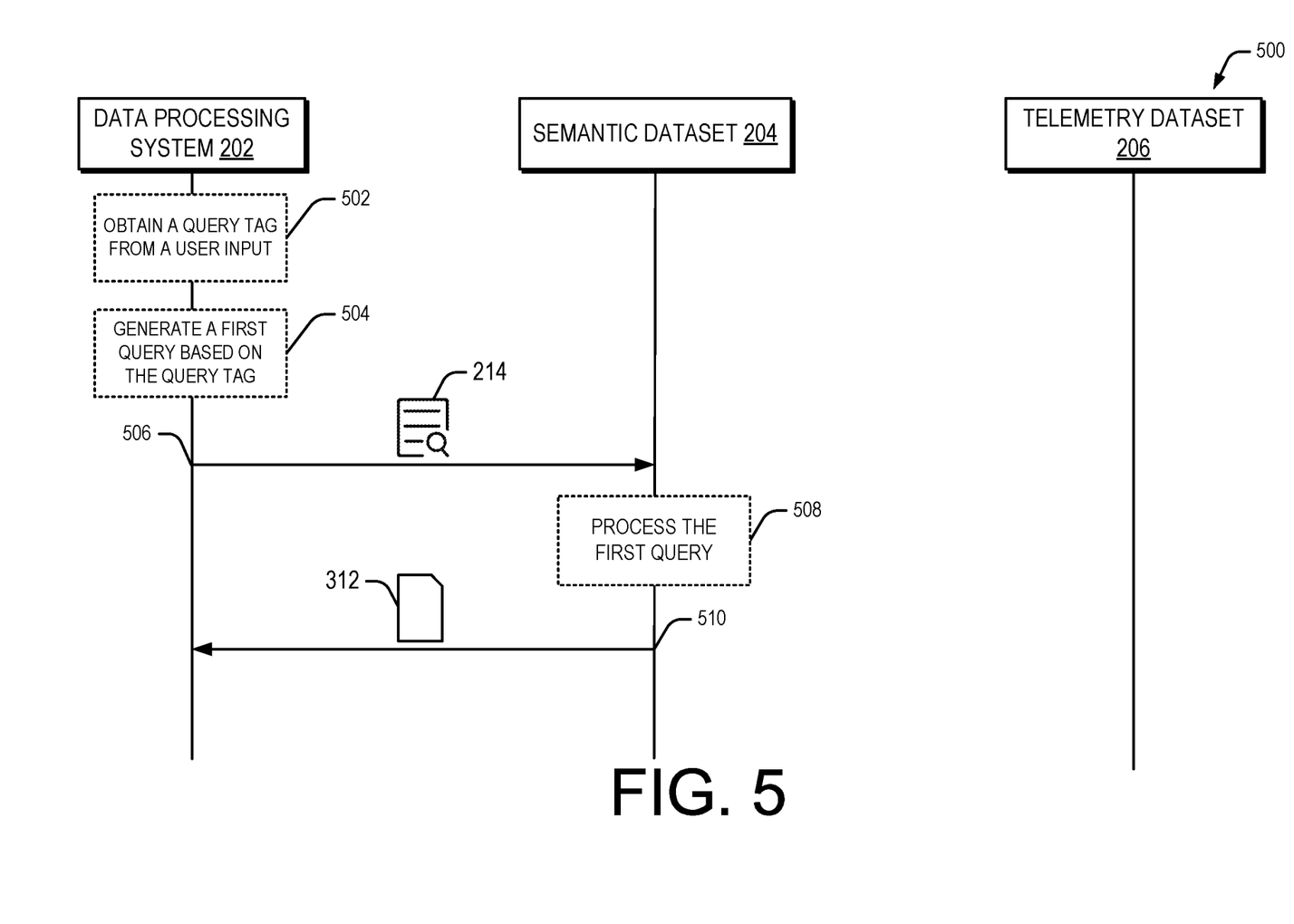
FIGS. 5-6 illustrates example call flow diagrams representing querying of a semantic dataset and telemetry dataset by a data processing system, as per an example.

It may be noted that the received telemetry data 218 may be provided and displayed onto a display device which may be coupled to the system 202. To this end, the system 202 may also provide a user interface (UI) which may display information that may be available at different stages of the above-mentioned process. For example, once the FIG. 5 illustrates an example call flow diagram representing communication between various computational entities (such as one of the system 202) as described in FIGS. 2-4), as per one example. In the present call flow, the manner in which the system 202 interacts and functions in relation to the semantic dataset 204, is explained. The present explanation is provided with reference to the system 202. As described previously, the system 202 may be in communication with the semantic dataset 204 and the telemetry dataset 206 over a communication network. The semantic dataset 204 may include the contextual information 302, the tag(s) 304 and the ID(s) 306 pertaining to the different data endpoints 212 of the physical assets 210. The telemetry dataset 206 on the other hand may include the telemetry data 308, and the ID(s) 306 of the corresponding data endpoints 212 which may have generated the telemetry data 308.

In operation, one or more query tag(s) 310 may be received by the system 202 (as indicated by step 502). The query tag(s) 310 may be received from an individual user, such as a facility manager associated with the facility 208 and may be stored in the system 202. In an example, the query tag(s) 310 may specify a query-name, or a query-value, as argument types. The query tag(s) 310 may specify a single argument or may specify a combination of different arguments without deviating from the scope of the present subject matter.

Based on the received query tag(s) 310, the processing engine 412 within the system 202 may generate a first query 214 (as indicated by step 504). For example, the processing engine 412 may generate a first query 214 based on the query tag(s) 310 as arguments. The first query 214 may then be executed by the processing engine 412 on the semantic dataset 204. To this end, the processing engine 412 may send the first query 214 to the semantic dataset 204 for execution (as indicated by step 506). As explained previously, the semantic dataset 204 includes contextual information 302, the tag(s) 304 and the ID(s) 306 corresponding to the data endpoints 212. Since the first query 214 include arguments provided in the query tag(s) 310, the execution of the first query 214 would result in identifying the unique identifiers of certain data endpoints 212 for which the tag(s) 304 correspond to the arguments of the query tag(s) 310.

In an example, the processing engine 412 of the system 202 may execute the first query 214 on the semantic dataset 204 (as indicated in step 508). For processing the first query 214, the processing engine 412 may cause the execution of the first query 214. In another example, the semantic dataset 204 may include executable instructions for processing the first query 214 received from the system 202. The execution of the first query 214 is explained by an example wherein which the query tag(s) 310 may specify 'hvac' as one of the arguments in the first query 214. Upon execution, the example argument provided in the first query 214 may be compared with the tag(s) 304 provided in the semantic dataset 204. Based on the comparison, the processing engine 412 may determine the corresponding unique identifiers, i.e., reference unique identifier(s) 312. Once the reference unique identifier(s) 312 are determined, the semantic dataset 204 may provide the same to the system 202 (as indicated in step 510) within the system 202. In an example, the reference unique identifier(s) 312 once obtained may be stored by the system 202 as reference unique identifier(s) 312.

Figure 6:
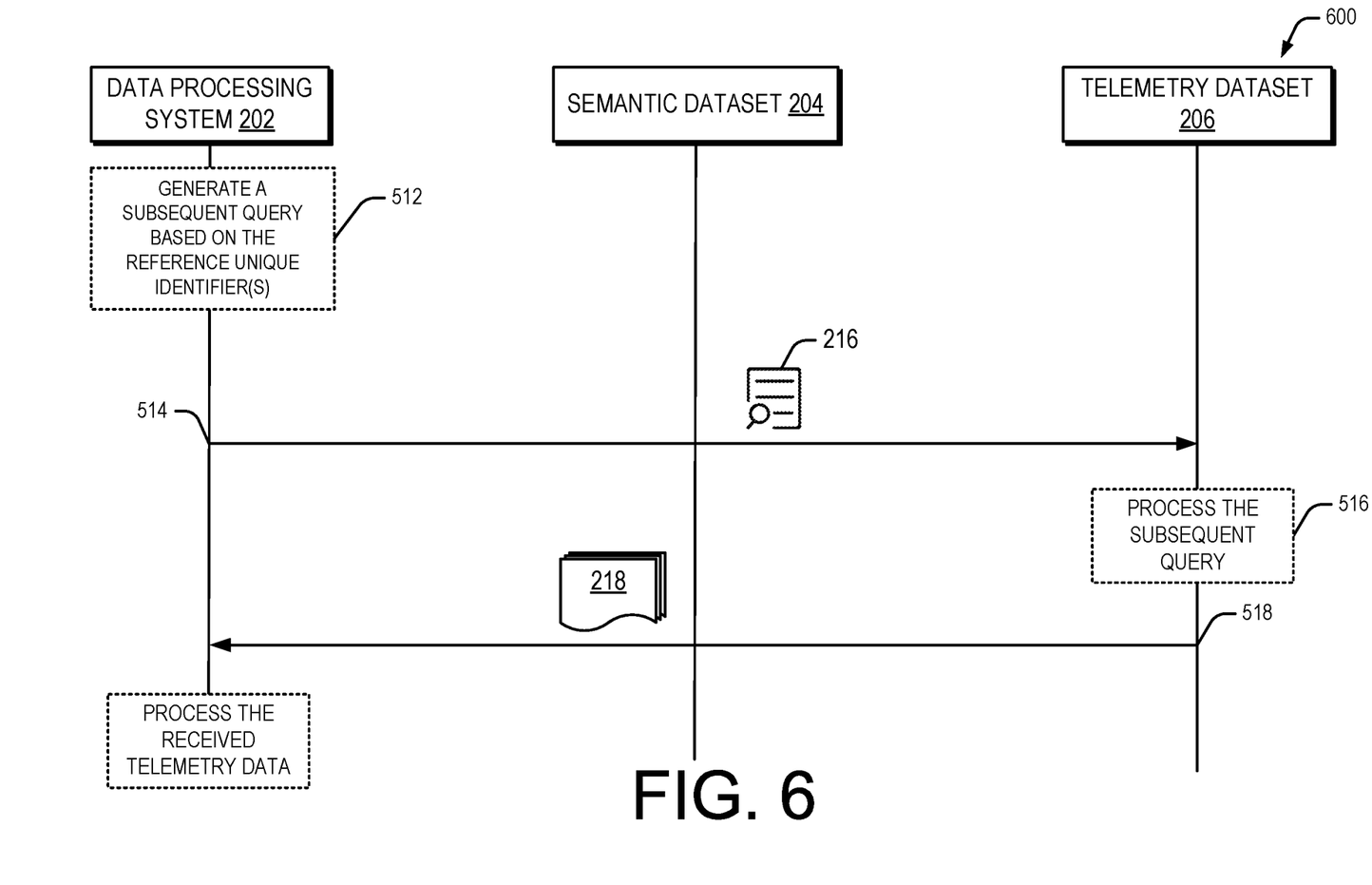

FIG. 6 illustrates an example call flow diagram representing communication between various computational entities (such as one of the system 202) as described in FIGS. 2-4), as per another example. In the present call flow, the manner in which the system 202 interacts and functions in relation to the telemetry dataset 206, is explained. As described in conjunction with FIG. 5, the reference unique identifier(s) 312 is obtained as a result of the execution of the first query 214 and is obtained by the system 202. Once the reference unique identifier(s) 312 is obtained, the processing engine 412 of the system 202 may generate a subsequent query 216. In an example, the subsequent query 216 is generated based on the reference unique identifier(s) 312 as the argument (as indicated in step 512).

The subsequent query 216 may then be passed on to the telemetry dataset 206 by the processing engine 412 where it may be executed (as indicated by step 514). As explained previously, the telemetry dataset 206 includes the telemetry data 308 and the ID(s) 306 of the data endpoints 212 which may have generated such telemetry data, such as the telemetry data 308. Since the subsequent query 216 include the reference unique identifier(s) 312 as the arguments, the execution of the subsequent query 216 would result in identifying one or more ID(s) 306 based on the reference unique identifier(s) 312.

In an example, the processing engine 412 of the system 202 may execute the subsequent query 216 on the telemetry dataset 206 (as indicated in step 516). For processing the subsequent query 216, the processing engine 412 may cause the execution of the subsequent query 216. In another example, the telemetry dataset 206 may include executable instructions for processing the subsequent query 216 received from the system 202. The execution of the subsequent query 216 on the telemetry dataset 206 may result in identifying the ID(s) 306 within the telemetry dataset 206 which correspond to the reference unique identifier(s) 312. The execution of the subsequent query 216 may involve comparing of the identifier provided as an argument in the subsequent query 216 with the ID(s) 306 in the telemetry dataset 206. Based on the comparison, the processing engine 412 may determine the relevant ID(s) 306. Once the relevant ID(s) 306 are determined, the associated telemetry data may be retrieved and provided to the system 202 (as indicated in step 518). In an example, the retrieved telemetry data may be provided to the system 202 as received telemetry data 218. The received telemetry data 218 may thereafter be processed further by the processing engine 412 to determine various insights into the operation of the physical assets 210 within the facility 208. Although the present example depicts processing of the received telemetry data 218 by the system 202, the received telemetry data 218 may be processed by another system. To this end, the received telemetry data 218 may be periodically stored and then subject to further analysis by an analysis system, which may be distinct from the system 202.

Figure 7:
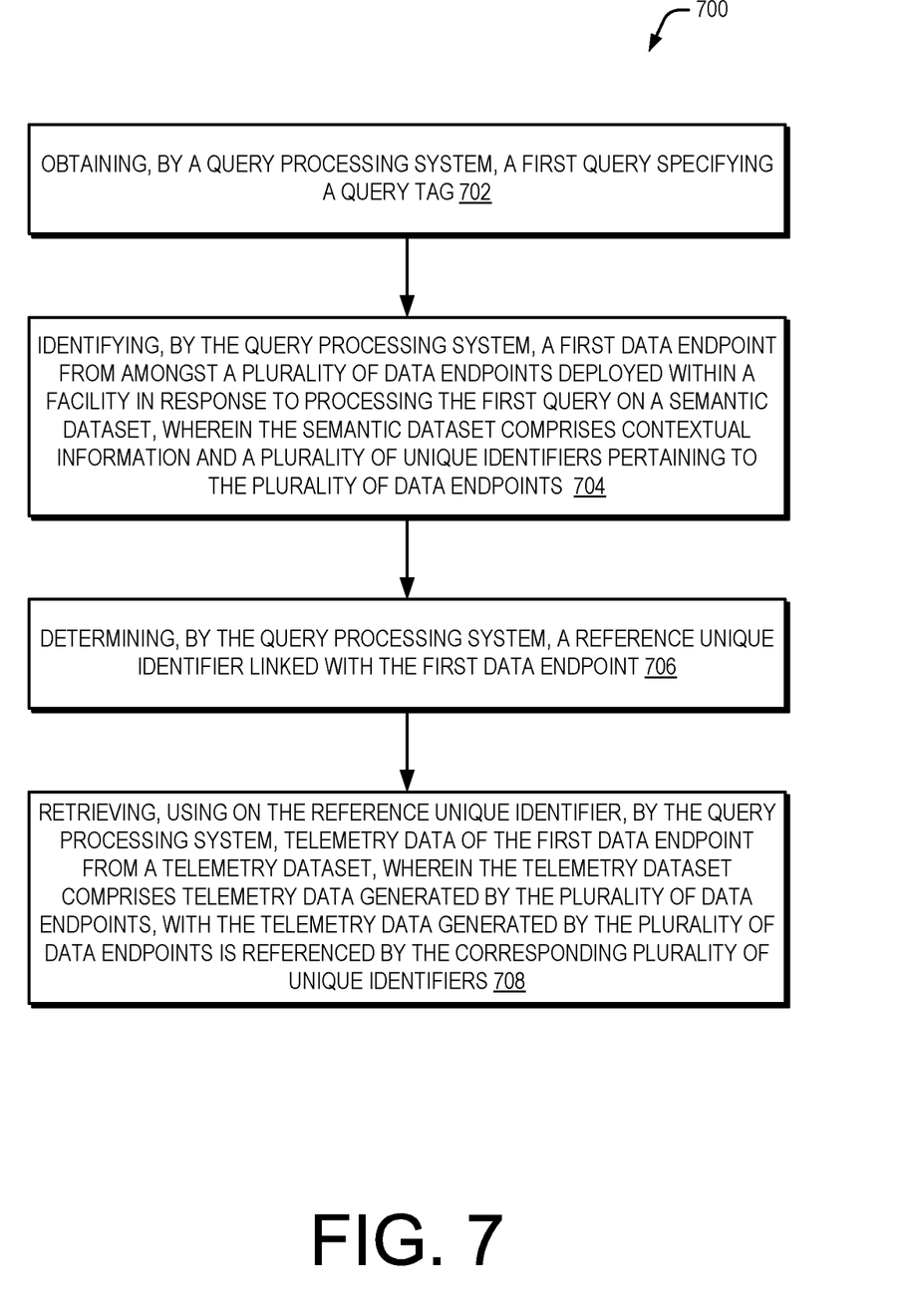
FIG. 7 illustrates a method for querying a telemetry dataset, as per an example.

FIG. 7 illustrates a method for querying a telemetry dataset are described, as per another example. The order in which the above-mentioned method is described is not intended to be construed as a limitation, and some of the described method blocks may be combined in a different order to implement the method, or an alternative method.

Furthermore, the above-mentioned method may be implemented in a suitable hardware, computer-readable instructions, or combination thereof. The steps of such method may be performed by either a system under the instruction of machine executable instructions stored on a non-transitory computer readable medium or by dedicated hardware circuits, microcontrollers, or logic circuits. For example, the method may be performed by a query processing system, such as data processing system 202. In an implementation, the method may be performed under an "as a service" delivery model, where the data processing system 202, may be operated by a provider, and receives programmable code. Herein, some examples are also intended to cover non-transitory computer readable medium, for example, digital data storage media, which are computer readable and encode computer-executable instructions, where said instructions perform some or all the steps of the above-mentioned methods.

At block 702, a first query specifying a query tag may be obtained by a query processing system. For example, the data processing system 202 may initially receive query tag(s) 310 from a user. The query tag(s) 310 may specify one or more values based on which the corresponding tag(s) 304 may be searched. Based on the query tag(s) 310 as the arguments, the processing engine 412 of the system 202 may generate a first query 214.

At block 704, the query processing system may identify a first data endpoint from amongst multiple data endpoints which may be deployed within a facility. For example, the processing engine 412 may cause the execution of the first query 214 on the semantic dataset 204. Since the first query 214 is based on the query tag(s) 310, upon execution a first data endpoints 212, say data endpoint 212-1, may be identified. The identification of the data endpoint 212-1 is performed by comparing the tag(s) 304 and the arguments of the first query 214. The data endpoint 212-1 may be selected if its corresponding tag(s) 304 matches or conforms with the tags specified in the first query 214.

At block 706, a reference unique identifier corresponding to the first data endpoint may be determined. For example, the processing engine 412 on identifying the data endpoint 212-1 as the first data endpoint may accordingly determine its corresponding unique identifier. The unique identifier of the data endpoint 212-1 is referred to as the reference unique identifier(s) 312.

At block 708, telemetry data collected by the first data endpoint may be retrieved using the reference unique identifier. For example, the processing engine 412 may initially generate a subsequent query 216 based on the reference unique identifier(s) 312 as the argument. The subsequent query 216 may thereafter be executed on the telemetry dataset 206. Upon execution, one or more of the data endpoints 212, say data endpoint 212-1, may be determined for which the ID(s) 306 matches the reference unique identifier(s) 312 as specified in the subsequent query 216. Once identified, the telemetry data 308 of the data endpoint 212-1 may be retrieved and stored as the received telemetry data 218. The received telemetry data 218, in an example, may be further analyzed to gain insights into the operations of the physical assets 210 within the facility 208.

Figure 8:
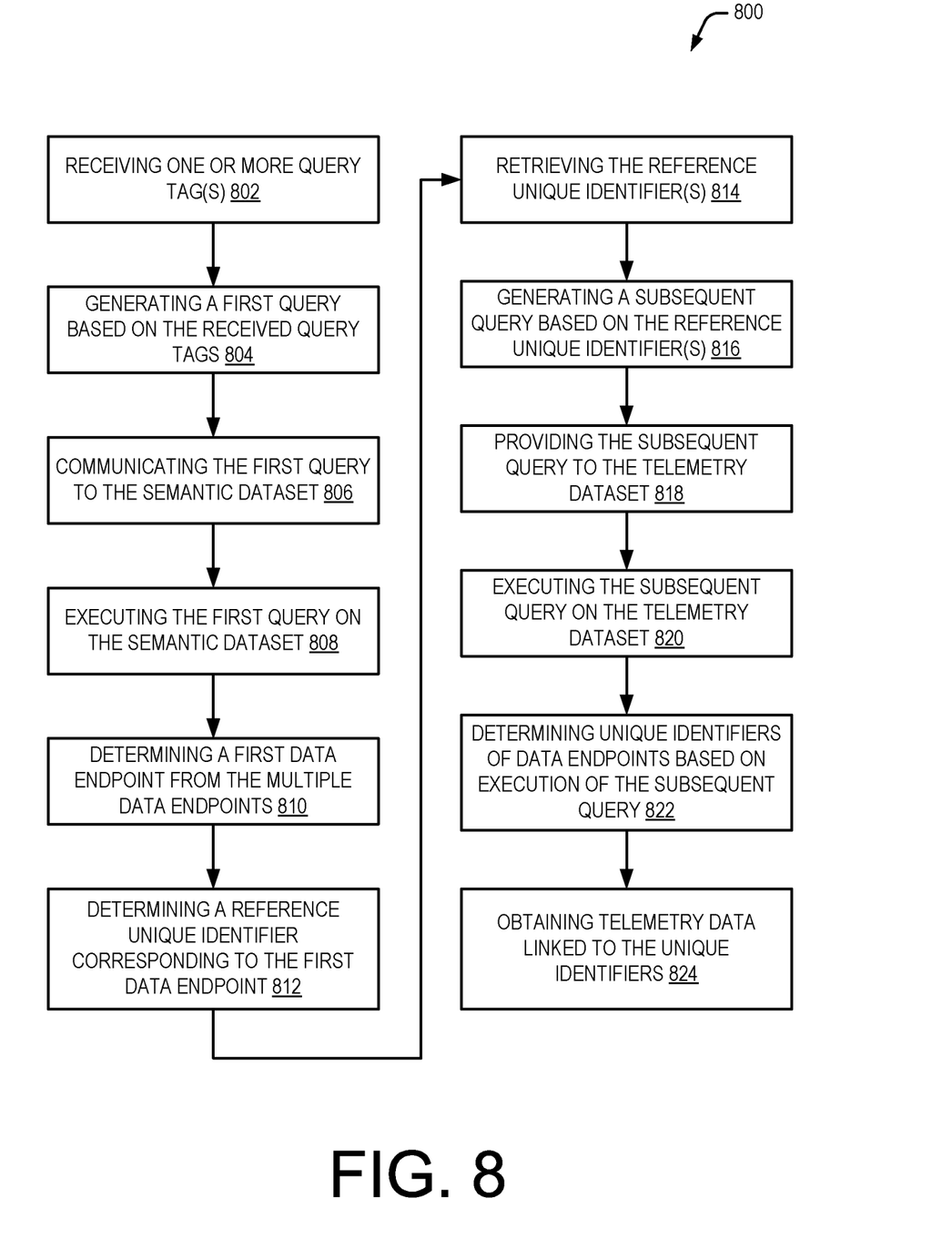
FIG. 8 illustrates a method for querying a telemetry dataset, as per an example.

FIG. 8 illustrates a method for querying a telemetry dataset are described, as per another example. The order in which the above-mentioned method is described is not intended to be construed as a limitation, and some of the described method blocks may be combined in a different order to implement the method, or an alternative method.

At block 802, one or more query tags may be received. For example, one or more query tag(s) 310 may be received by the system 202. The query tag(s) 310 may be received from an individual user, such as a facility manager associated with the facility 208 and may be stored in the system 202. In another example, the query tag(s) 310 may be selected from a list of predefined query tag(s) 310. Other examples of providing the query tag(s) 310 are also possible, with such examples also falling within the scope of the present subject matter. The query tag(s) 310 may specify a query-name, or a query-value as argument types.

At block 804, a first query may be generated based on the query tags received. For example, the processing engine 412 on receiving the query tag(s) 310, may generate a first query 214 using the parameters provided in the query tag(s) 310 as arguments. In an example, the processing engine 412 to generate the first query 214 may initially parse the query tag(s) 310 to identify the parameters that may have been provided in the query tag(s) 310. The processing engine 412 may then generate the first query 214 using such parameters obtained by parsing the query tag(s) 310. In an example, the query tag(s) 310 may be such that they include one or multiple tags.

At block 806, the first query may be communicated to the semantic dataset. For example, the processing engine 412 on generating the first query 214, may send the same to the semantic dataset 204 for execution. As explained previously, the semantic dataset 204 includes contextual information 302, the tag(s) 304 and the ID(s) 306 corresponding to the data endpoints 212.

At block 808, the first query may be executed on the semantic dataset. For example, the first query 214 may be executed by the processing engine 412 on the semantic dataset 204. As explained previously, the semantic dataset 204 may include contextual information 302, the tag(s) 304 and the ID(s) 306 corresponding to the data endpoints 212. Since the first query 214 include arguments provided in the query tag(s) 310, the execution of the first query 214 results in determining the unique identifiers of certain data endpoints 212 for which the tag(s) 304 correspond to the arguments of the query tag(s) 310. In an example, for processing the first query 214, the processing engine 412 may cause the execution of the first query 214. Alternatively, the semantic dataset 204 may include executable instructions for processing the first query 214 received from the system 202.

At block 810, a first data endpoint from amongst the multiple data endpoints may be determined in response to the execution of the first query. For example, the processing engine 412, upon execution of the first query 214, may cause comparison of the argument provided in the first query 214 with the tag(s) 304 provided in the semantic dataset 204. Based on the comparison, the processing engine 412 may determine a first data endpoint (say the data endpoint 212-1) for which the tag(s) 304 correspond to the arguments provided in the first query 214.

At block 812, a reference unique identifier for the first data endpoint may be determined. For example, once the first data endpoint (i.e., the data endpoint 212-1) is determined, the processing engine 412 may determine its corresponding unique identifier, i.e., the reference unique identifier(s) 312. It may be noted that in addition to the data endpoint 212-1, other data endpoints 212 may also be identified based on the reference unique identifier(s) 312. Such examples would be within the purview of the present subject matter.

At block 814, the reference unique identifiers determined as a result of the execution of the first query, are retrieved. For example, once the reference unique identifier(s) 312 are determined, the same may be retrieved by the processing engine 412.

At block 816, a subsequent query may be generated based on the reference unique identifiers. For example, the processing engine 412 of the system 202 thereafter generates a subsequent query 216 based on the reference unique identifier(s) 312 as the argument.

At block 818, the subsequent query may be provided to the telemetry dataset. For example, the subsequent query 216 may then be passed on to the telemetry dataset 206 by the processing engine 412 for execution. In an example, the subsequent query 216 may be passed to the semantic dataset 204 over a communication network which is communicatively coupled to the system 202.

At block 820, the subsequent query may be executed on the telemetry dataset. For example, the processing engine 412 may execute the subsequent query 216 on the telemetry dataset 206. It may be noted that the subsequent query 216 includes the reference unique identifier(s) 312 as the argument. When executing, the reference unique identifier(s) 312 as the argument is compared with the ID(s) 306 provided in the telemetry dataset 206. The ID(s) 306 identify the data endpoints 212 and the corresponding telemetry data 308.

At block 822, based on the execution of the subsequent query, unique identifiers of data endpoints from the telemetry dataset may be determined. For example, execution of the subsequent query 216 would involve comparing the reference unique identifier(s) 312 provided in the subsequent query 216 with the ID(s) 306 provided within the telemetry dataset 206. In an example, the ID(s) 306 which match the reference unique identifier(s) 312 are subsequently determined.

At block 824, telemetry data linked with the determined identifiers, is obtained. For example, the processing engine 412 retrieves the telemetry data 308 for the ID(s) 306 which match the reference unique identifier(s) 312. In an example, the retrieved telemetry data 308 may be stored in the system 202 separately as received telemetry data 218. In this manner, the appropriate telemetry data 308 for data endpoints 212 selected based on the query tag(s) 310 may be obtained.

Figure 9:
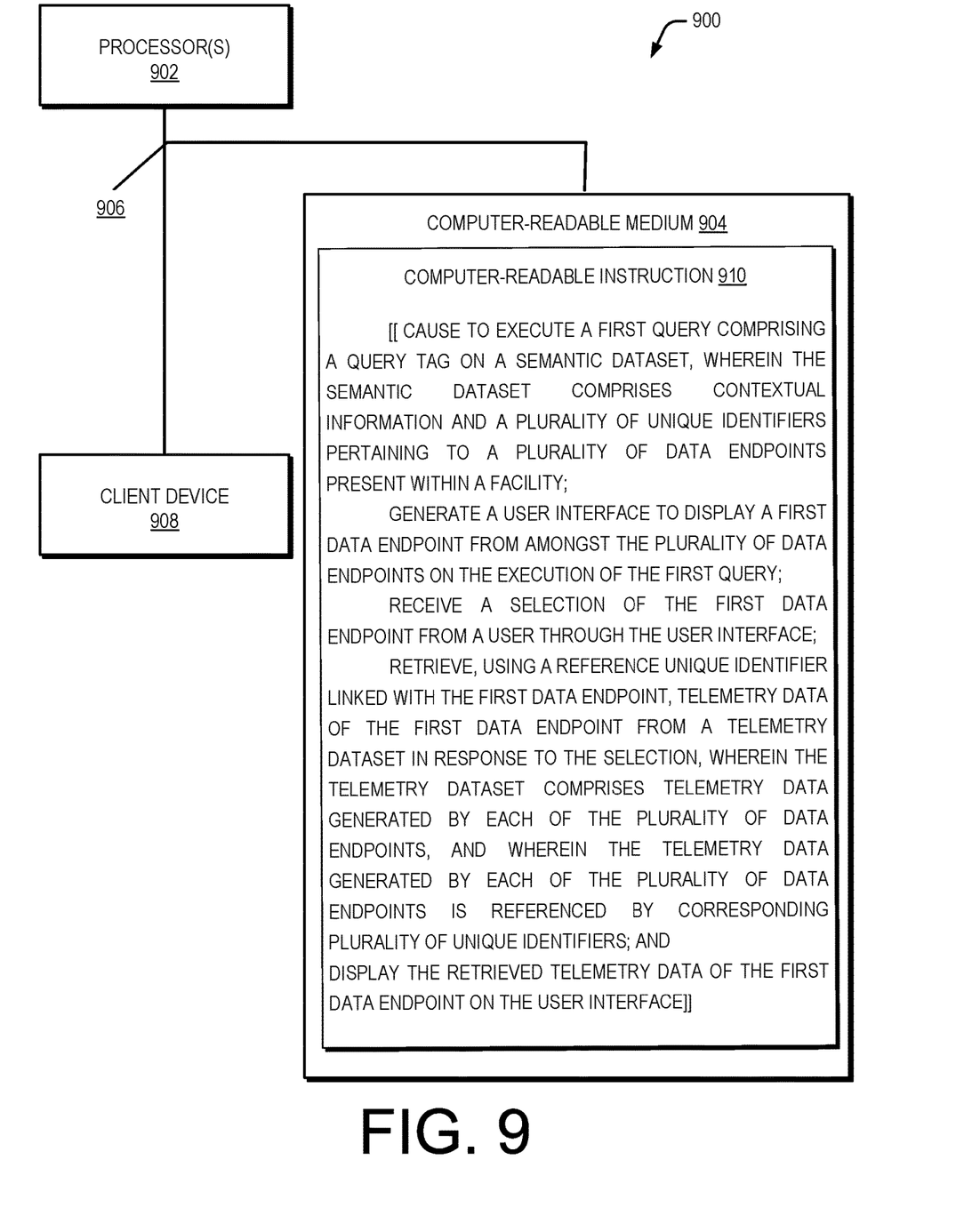
FIG. 9 illustrates a system environment implementing a non-transitory computer readable medium for querying a telemetry dataset, as per an example.

FIG. 9 illustrates a computing environment 900 implementing a non-transitory computer readable medium for querying a telemetry dataset. In an example, the computing environment 900 includes processor(s) 902 communicatively coupled to a non-transitory computer readable medium 904 through a communication link 906. In an example implementation, the computing environment 900 may be a data processing system 202. The data processing system 202 in turn may be communicatively coupled to the semantic dataset 204 and the telemetry dataset 206 through a communication network. In an example, the processor(s) 902 may have one or more processing resources for fetching and executing computer-readable instructions from the non-transitory computer readable medium 904. The processor(s) 902 and the non-transitory computer readable medium 904 may be implemented, for example, in data processing system 202 (as has been described in conjunction with the preceding figures).

The non-transitory computer readable medium 904 may be, for example, an internal memory device or an external memory device. In an example implementation, the communication link 906 may be a network communication link. The processor(s) 902 and the non-transitory computer readable medium 904 may also be communicatively coupled to a computing device 908 over the network.

In an example implementation, the non-transitory computer readable medium 904 includes a set of computer readable instructions 910 (referred to as instructions 910) which may be accessed by the processor(s) 902 through the communication link 906. Referring to FIG. 10, in an example, the non-transitory computer readable medium 904 includes instructions 910 that cause the processor(s) 902 to execute a first query comprising a query tag. For example, the instructions 910 may generate a first query 214 based on tags specified in the query tag(s) 310. The generated first query 214 may then be executed on semantic dataset 204.

As described previously, the semantic dataset 204 comprises contextual information, such as the contextual information 302, and a plurality of unique identifiers, or ID(s) 306, pertaining to a plurality of data endpoints 212 present within facility 208. Thereafter, the instructions 910 may cause to generate a user interface to display a first data endpoint from amongst the plurality of data endpoints on the execution of the first query. In an example, the first data endpoint, such as the data endpoint 212-1, may be selected and displayed on a user interface of a computing device. Once the first data endpoint is determined, the instructions 910 may result in receiving a selection of the first data endpoint.

When selected, the instructions 910 may thereafter retrieve, using a reference unique identifier linked with the first data endpoint, telemetry data of the first data endpoint from a telemetry dataset in response to the selection. In an example, the instructions 910 may cause retrieval of the reference unique identifier(s) 312, say of the data endpoint 212-1. Once the reference unique identifier(s) 312 is determined, the instructions 910 may generate a subsequent query 216 based on the reference unique identifier(s) 312. The subsequent query 216 may thereafter be executed on the telemetry dataset 206 which in turn may provide the telemetry data corresponding to the data endpoint 212-1. In an example, the retrieved telemetry data is stored as received telemetry data 218. The instructions 910 may further cause the received telemetry data 218 to be displayed on the display of a computing device.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

The invention claimed is:

1. A system comprising:
a processor; and
a machine-readable storage medium comprising instructions executable by the processor to:
cause to execute a first query comprising a query tag on a semantic dataset, wherein the semantic dataset comprises:

contextual information pertaining to a plurality of data endpoints of a physical asset deployed within a facility, and a plurality of unique identifiers corresponding to the plurality of data endpoints;

identify a first data endpoint from amongst the plurality of data endpoints in response to the execution of the first query;

obtain a reference unique identifier linked with the first data endpoint;

cause to execute a subsequent query comprising the reference unique identifier on a telemetry dataset, wherein the telemetry dataset comprises telemetry data generated by each of the plurality of data endpoints of the physical asset deployed within the facility, and wherein the telemetry data generated by each of the plurality of data endpoints is referenced by the plurality of unique identifiers;

retrieve the telemetry data of the first data endpoint from a database as a result of execution of the subsequent query; and display the retrieved telemetry data of the first data endpoint on a user interface.

2. The system as claimed in claim 1, wherein each of the plurality of data endpoints are further associated with prespecified tags.

3. The system as claimed in claim 2, wherein to process the first query, the instructions executable by the processor are to compare the query tag with each of prespecified tags.

4. The system as claimed in claim 2, wherein the prespecified tags comprise a namespace corresponding to the physical asset and a tag name.

5. The system as claimed in claim 1, further comprising instructions executable by the processor to process the retrieved telemetry data of the first data endpoint to provide metric-based assessment pertaining to operation of the physical asset within the facility.

6. The system as claimed in claim 1, wherein the contextual information pertaining to the physical asset comprises geographical location information of the physical asset within the facility, a configuration setting of the physical asset, a data type for the telemetry data generated by plurality of data endpoints of the physical asset, a relation between the physical asset and any one of the plurality of data endpoints, or combination thereof.

7. The system as claimed in claim 1, wherein the query tag specifies a tag name, a tag value, or a combination thereof.

8. The system as claimed in claim 1, wherein the telemetry data comprises timeseries data corresponding to data values historically generated by the plurality of data endpoints.

9. The system as claimed in claim 8, wherein the telemetry data conforms to a schema, with the schema being commonly applicable for telemetry data generated by the plurality of data endpoints within the facility.

10. A method comprising:

obtaining, by a query processing system, a first query specifying a query tag;

identifying, by the query processing system, a first data endpoint from amongst a plurality of data endpoints deployed within a facility in response to processing the first query on a semantic dataset, wherein the semantic dataset comprises contextual information and a plurality of unique identifiers pertaining to the plurality of data endpoints;

determining, by the query processing system, a reference unique identifier linked with the first data endpoint;

retrieving, using on the reference unique identifier, by the query processing system, telemetry data of the first data endpoint from a telemetry dataset stored in a database, wherein the telemetry dataset comprises telemetry data generated by the plurality of data endpoints of the physical asset deployed within the facility, with the telemetry data generated by the plurality of data endpoints is referenced by the plurality of unique identifiers; and displaying, the retrieved telemetry data of the first data endpoint on a user interface.

11. The method as claimed in claim 10, wherein the identifying comprises:

comparing the query tag with prespecified tags associated with each of the plurality of data endpoints; and identifying one endpoint from amongst the plurality of data endpoints as the first data endpoint, wherein a prespecified tag of the first data endpoint matches the query tag.

12. The method as claimed in claim 11, wherein the prespecified tags comprise a namespace corresponding to a physical asset and a tag name, wherein the physical asset is associated with the plurality of data endpoints.

13. The method as claimed in claim 12, wherein the prespecified tags are defined using a tag dictionary.

14. The method as claimed in claim 10, wherein the query tag specifies a tag name, a tag value, or a combination thereof.

15. The method as claimed in claim 10, wherein the method further comprises processing the retrieved telemetry data of the first data endpoint using a set of predefined rule to generate insights and operational metrics pertaining to the plurality of data endpoints within the facility.

16. The method as claimed in claim 10, wherein the plurality of data endpoints comprises sensors implemented in sub-systems of a physical asset deployed within the facility.

17. The method as claimed in claim 10, wherein the telemetry data comprises timeseries data corresponding to data values historically generated by the plurality of data endpoints.

18. A non-transitory computer-readable medium comprising instructions, the instructions being executable by a processing resource to:

cause to execute a first query comprising a query tag on a semantic dataset, wherein the semantic dataset comprises contextual information and a plurality of unique identifiers pertaining to a plurality of data endpoints present within a facility;

generate a user interface to display a first data endpoint from amongst the plurality of data endpoints on the execution of the first query;

receive a selection of the first data endpoint from a user through the user interface;

retrieve, using a reference unique identifier linked with the first data endpoint, telemetry data of the first data endpoint from a telemetry dataset stored in a database, wherein the telemetry dataset comprises telemetry data generated by each of the plurality of data endpoints of the physical asset deployed within the facility, and wherein the telemetry data generated by each of the plurality of data endpoints is referenced by corresponding plurality of unique identifiers; and display the retrieved telemetry data of the first data endpoint on the user interface.

19. The non-transitory computer-readable medium as claimed in claim 18, wherein each of the plurality of data endpoints are associated with prespecified tags.

20. The non-transitory computer-readable medium as claimed in claim 19, wherein to display the first data endpoint, the instructions are executable by the processing resource to compare the query tag with each of prespecified tags to identify the first data endpoint.

\* \* \* \* \*